United States Patent [19]

Sato

[11] Patent Number: 4,654,498

[45] Date of Patent: Mar. 31, 1987

[54] ELECTRICAL DISCHARGE MACHINING ELECTRODE FOR FORMING MINUTE HOLES IN A WORKPIECE AND ELECTRICAL DISCHARGE MACHINING APPARATUS EMPLOYING SUCH AN ELECTRODE

[75] Inventor: Takeo Sato, Sagamihara, Japan

[73] Assignee: Matsushita Electric Industrial Co., Ltd., Japan

[21] Appl. No.: 612,013

[22] Filed: May 18, 1984

[30] Foreign Application Priority Data

May 19, 1983 [JP] Japan ................... 58-88512
May 19, 1983 [JP] Japan ................... 58-88530

[51] Int. Cl.⁴ .................. B23H 1/04; B23H 7/26
[52] U.S. Cl. .................. 219/69 E; 219/69 V
[58] Field of Search ........... 219/69 E, 69 R, 68, 219/69 M, 69 V, 69 W, 69 G

[56] References Cited

U.S. PATENT DOCUMENTS

| | | | |
|---|---|---|---|
| 1,061,612 | 5/1913 | Heroult | 219/69 G |
| 2,580,398 | 1/1952 | Braswell | 219/69 V |
| 2,751,482 | 6/1956 | Stepath | 219/70 |
| 3,053,966 | 9/1962 | Landis et al. | 219/69 V |
| 3,335,313 | 8/1967 | Luimes et al. | 219/69 G |
| 3,388,232 | 6/1968 | Dreisin | 219/69 M |
| 3,469,056 | 9/1969 | O'Connor | 219/69 V |
| 3,474,215 | 10/1969 | Johanson | 219/69 E |
| 3,499,139 | 3/1970 | Chmiel | 219/68 |
| 3,539,754 | 11/1970 | Furze et al. | 219/69 V |
| 3,590,210 | 6/1971 | O'Connor | 219/69 G |
| 3,727,023 | 4/1973 | Monnich | 219/69 E |
| 3,806,691 | 4/1974 | Roach | 219/69 G |
| 4,485,287 | 11/1984 | Hamasaki et al. | 219/69 W |

FOREIGN PATENT DOCUMENTS

| | | | |
|---|---|---|---|
| 147478 | 11/1980 | Japan | 219/69 M |
| 138545 | 8/1982 | Japan | 219/69 E |
| 759190 | 10/1956 | United Kingdom | 219/69 G |

Primary Examiner—A. D. Pellinen
Assistant Examiner—Geoffrey S. Evans
Attorney, Agent, or Firm—Lowe, Price, LeBlanc, Becker & Shur

[57] ABSTRACT

An electrode consisting of a core wire, a support tube having a bore in which the electrode core wire is slidably supported, an outer peripheral surface held in highly concentric relation to the bore, and a rotatable support body for transmitting rotative power to the support tube. The support tube and the rotatable support body having a central axis and a center of rotation are aligned with each other for preventing the electrode from having wobbling movement or displacement during rotation of the electrode. This allows minute holes of small out-of-roundness and good accuracy of shape to be formed. In addition for fine feeding of an electrode an apparatus is used which includes a gear rotated by a motor to vertically move a feed screw that causes a pivot lever to move the electrode for a small vertical interval.

18 Claims, 16 Drawing Figures

ELECTRICAL DISCHARGE MACHINING ELECTRODE FOR FORMING MINUTE HOLES IN A WORKPIECE AND ELECTRICAL DISCHARGE MACHINING APPARATUS EMPLOYING SUCH AN ELECTRODE

BACKGROUND OF THE INVENTION

The present invention relates to an electrode for forming minute holes in a workpiece through an electrical discharge machining (EDM) or electroerosive machining process, and an EDM apparatus employing such an electrode.

There are two EDM machining processes for forming a minute hole having a diameter of 0.1 mm or smaller in a workpiece. In one process, the machining electrode is held at rest, and in the other process, the machining electrode is rotated about its own axis. Rotating the machining electrode could increase the machining speed, and improve out-of-roundness and accuracy of the shape of the hole formed. However, the machining process in which the electrode is held at rest during operation has heretofore been prevalent in the art since the electrode is not subjected to displacement and the time required for the electrode to form the hole is shorter.

Various electrode constructions are known for use in forming holes while the electrode is held at rest. Where a thin wire which requires no cutting is employed as an electrode, it is directly soldered to an electrode holder, or is plated, reinforced, and chucked, or protected and guided by a body of glass, ruby or the like and chucked. Where a relatively thick wire is used for an electrode, the tip end thereof is thinned by electrolytic grinding so as to serve as a machining electrode.

The above electrode constructions however fail to provide a degree of concentricity of a few microns or less between the machining tip and outer periphery of the electrode. It has been impossible to use such electrode in machining a hole while rotating the electrode since it is difficult to attach the electrode perpendicularly to the workpiece.

When a workpiece is subjected to an EDM process with the wire electrode held at rest, the shape of the wire electrode is transferred to the workpiece. No hole with small out-of-roundness would be formed in the workpiece if a commercially available thin wire finished to insufficient dimensional accuracies were used for machining.

One electrode construction used for machining a workpiece while the electrode is rotating is composed of a round rod having a diameter of about 1 mm which can be chucked. The electrode material as it is rotated is shaped into an electrode of a desired diameter by a reverse electrical discharge. Although the electrode thus formed has sufficient accuracy, it will take about one hour to form an electrode for forming a minute hole 30 micrometers across from an electrode material having a diameter of 1 mm. The thinned portion of the electrode which has a diameter of 30 micrometers is short in length and hence in service life. Because the electrode will be displaced once detached from the chuck, the electrode has to be formed again each time it machines a minute hole in a workpiece.

SUMMARY OF THE INVENTION

It is an object of the present invention to provide an electrical discharge machining apparatus for forming minute holes in a workpiece, which will eliminate the drawbacks of the conventional EDM electrode.

Another object of the present invention is to provide an electrical discharge machining electrode for forming minute holes in a workpiece, which has a support tube supporting an electrode core wire and a rotatable support body, the support tube and the rotatable support body having a central axis and a center of rotation which are aligned with each other highly accurately for preventing the electrode from wobbling movement or displacement during rotation thereof, so that minute holes of small out-of-roundness and good accuracy of shape can be formed in a workpiece.

Still another object of the present invention is to provide an electrical discharge machining electrode for forming minute holes, which can be fed out of a rotatable support body as the electrode is progressively consumed by electrical discharges, so that the electrode can be used for a long period of time.

A still further object of the present invention is to provide an electrical discharge machining electrode for forming minute holes, which can easily be manufactured from a commercially available thin core wire.

A still further object of the present invention is to provide an electrical discharge machining electrode for forming minute holes, which allows easy removal of machined chips produced upon electrical discharge machining for an increased machining speed.

A still further object of the present invention is to provide an electrical discharge machining apparatus employing a machining electrode of the foregoing arrangement.

According to the present invention, there is provided an electrical discharge machining electrode for forming a minute hole in a workpiece, comprising an electrode core wire slidably supported in a support tube having an outer periphery and a bore in which the electrode core wire is inserted, the outer periphery and the hole being in highly concentric relation to each other. The support tube is coupled to a rotatable support body by which rotative power is transmitted to the support tube, with their axes of rotation in alignment with each other. For easy removal of machined chips, the electrode core wire has a passage such as a recess or groove for discharging the machined chips.

Further according to the present invention, there is provided an electrical discharge machining apparatus for forming minute holes in a workpiece, which has an electrode assembly including a support tube supporting an electrical core wire and a rotatable support body for transmitting rotation to the support tube, the support tube and the rotatable support body being substantially held in coaxial alignment with each other. The electrode assembly is supported in V-shaped grooves in a bearing and movable toward and away from the workpiece.

BRIEF DESCRIPTION OF THE DRAWINGS

The present invention will be described in detail by way of illustrative example with reference to the accompanying drawing, in which.

DETAILED DESCRIPTION

Figure 2:
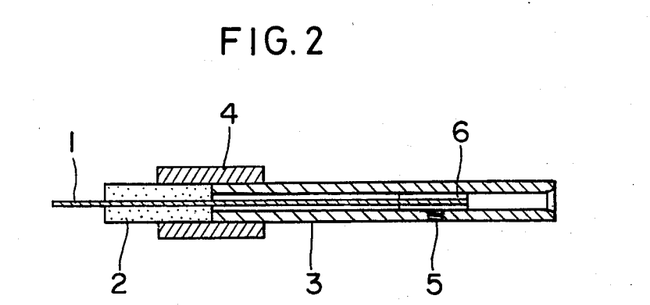
FIG. 2 is a longitudinal cross-sectional view of the machining electrode shown in FIG. 1.
Figure 3:
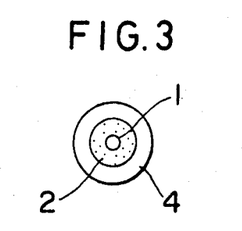
FIG. 3 is a front elevational view of the machining electrode shown in FIG. 1.
Figures 4A, 4B:
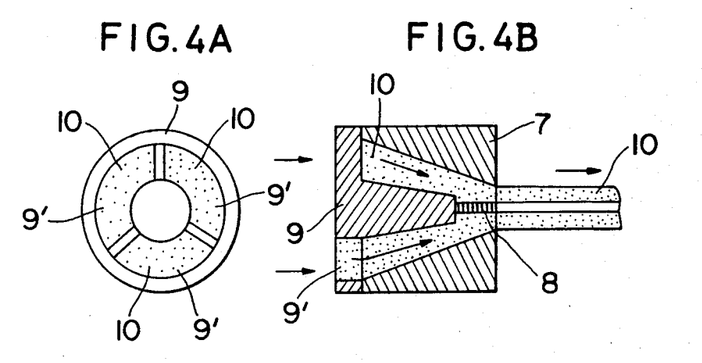
FIGS. 4A and 4B are side elevational and cross-sectional views of a die for fabricating a wire guide of the machining electrode.
Figure 5:
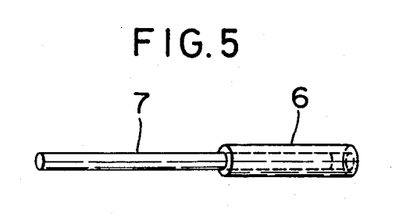
FIG. 5 is a perspective view of an electrode core wire in the machining electrode.

FIGS. 3 through 5 illustrate a machining electrode. The machining electrode is constructed of a thin electrode core wire 1 slidably guided in a wire guide or support tube 2 made of ceramics which is attached by a guide sleeve or tube 4 to a metal mandrel or rotatable support body 3. The wire 1 has an end connected to a pipe 6 made of an electrically conductive material and fixedly mounted in the mandrel 3 by means of a metal screw 5. As shown in FIG. 2, the wire guide 2 is fitted in the guide sleeve 4 with a clearance of 2 micrometers or smaller therebetween. The mandrel 3 is fitted in the guide sleeve 4 with a clearance as defined in JIS (Japanese Industrial Standards) h6 - P6.

According to the above embodiment, the wire guide 2 comprises a ceramic pipe for use as an optical fiber connector core, and the electrode core wire 1 is fitted therein with a clearance of 1 micrometer or less. The wire guide 2 has an outer peripheral surface and a bore which are concentric with each other with an error of 1 micrometer or less. The bore of the guide sleeve 4 is finished by lapping so that the inside diameter thereof differs from the outside diameter of the wire guide 2 by the range of 0 to 2 micrometers. The mandrel 3 is disposed in the guide sleeve 4 with a close fit having a clearance as defined in JIS h6 - P6. Since the wire guide 2 is supported by the guide sleeve 4 with the outer peripheral surface of the mandrel 3 serving as a positioning reference, the machining electrode is of high accuracy with the wire 1 displaceable to 4 micrometers at maximum.

A method of manufacturing the wire guide 2 with an error of concentricity between the outer peripheral surface and bore thereof being 1 micrometer or smaller will now be described with reference to FIGS. 4A and 4B.

Where the wire guide 2 is made of a sintered material such as ceramics, the wire guide 2 can be fabricated by vacuum extrusion molding. FIGS. 4A and 4B show a die used in vacuum extrusion molding. The die is composed of an outlet piece 7, a pin 8, and a pin holder 9 in which an end of the pin 8 is embedded. A kneaded mass 10 of ceramics is fed in the direction of the arrows to the right (as shown in FIG. 4B) through gaps 9' in the pin holder 9 into the outlet piece 7. The kneaded ceramic mass 10 is then extruded out of the die in the form of a pipe by means of the pin 8 and the outlet piece 7. Through increased accuracies of the combined pin 8 and the outlet piece 7, the error of concentricity between the bore and outer peripheral surface of the extruded ceramic pipe becomes 10 micrometers or smaller. After the extruded ceramic pipe has been subjected to firing, a wire is threaded through the bore of the ceramic pipe and the outer peripheral surface is cylindrically ground by a centerless grinder with the wire serving as a guide, thus producing a high-precision wire guide 2 having a concentricity error of 3 micrometers or smaller.

In producing pipes through extrusion molding, no manufacturing problem arises out of the fact that the outside diameter of the pipe becomes large with respect to the diameter of the bore therein, or the bore is enlarged.

The guide sleeve 4 may be machined by various processes such as lapping or honing since only the bore in the guide sleeve 4 in which the wire guide 2 is fitted should meet the prescribed dimensional tolerance. It is easy to keep the dimensions of the guide sleeve 4 within the tolerance ranging from 0 to 2 micrometers.

A fit as prescribed by JIS h6 - P6 can easily be achieved between the mandrel 3 and the guide sleeve 44 simply by grinding the outer peripheral surface of the guide sleeve 4 with a cylindrical grinding machine.

In order to hold the thin wire 1 serving as the machining electrode highly linearly within the mandrel 3 and also to provide electric conductivity between the wire 1 and the mandrel 3, a pipe 6 is staked or soldered or otherwise connected to a rear end of the wire 1, as shown in FIG. 5, and then is secured to the mandrel 3 by a metal setscrew 5, as illustrated in FIG. 2. The wire guide 2 is fitted in the mandrel 3 with a clearance as prescribed by JIS h6 - H7.

Figure 6:
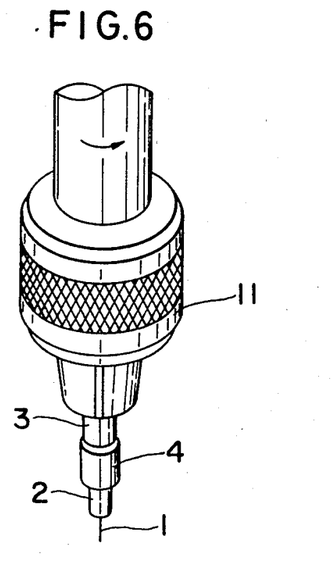
FIG. 6 is a fragmentary perspective view showing the manner in which the machining electrode is used.
Figure 7:
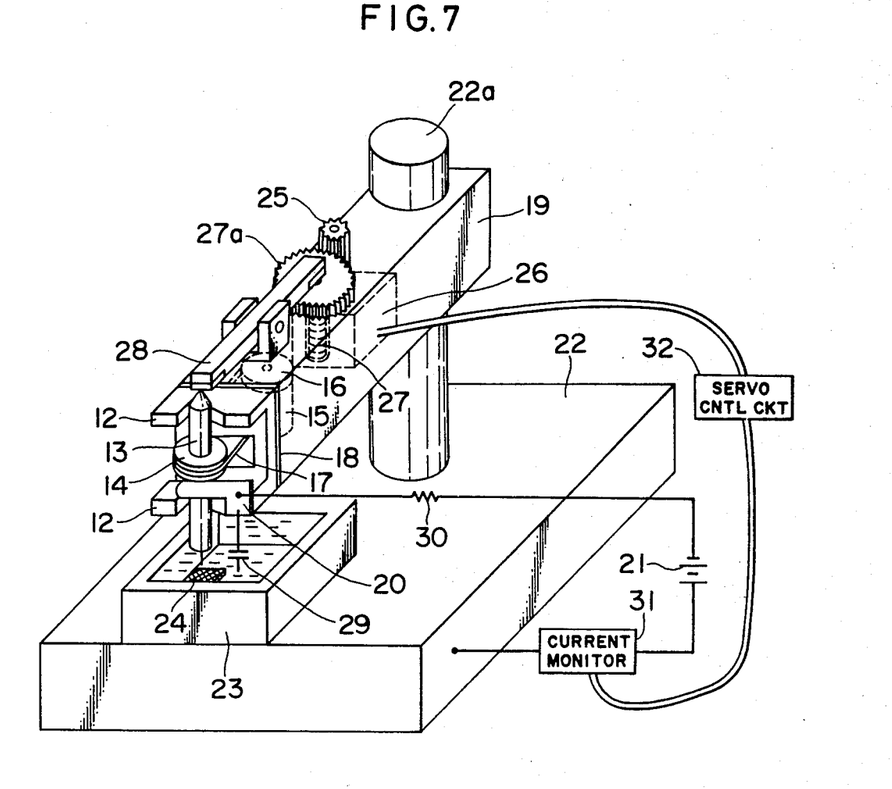
FIG. 7 is a perspective view of an electrical discharge machining apparatus employing the machining electrode of the present invention.

In actual electrical discharge machining operations, the mandrel 3 is chucked by a scroll chuck 11 as shown in FIG. 6, or is supported a V-shaped block bearing as shown in FIG. 7 while in rotation for an electrical discharge.

An electrical discharge machining apparatus employing such a V-shaped block bearing as illustrated in FIG. 7 will be described.

In FIG. 7, a machining electrode 13 is rotatably supported by a support or bearing 12 having V-shaped grooves, and will be rotated by a belt 17 trained around a pulley 14 on the machining electrode 13 and a pulley 16 on a motor 15, while at the same time the machining electrode 13 is held against the bearing 12. Since the pulley 16 is located upwardly of the pulley 14, the machining electrode 13 is biased to move upwardly under the tension of the belt 17 while being rotated by the motor 15. The machining electrode 13, the bearing 13, and the pulley 14 jointly constitute an electrode assembly electrically insulated by an insulator 18 as of ceramics from a body 19 of the EDM apparatus. The electrode assembly is electrically connected to a DC power supply 21 by means of a brush 20. Accordingly, the electrode assembly suffers a small stray capacity, and the voltage required for producing an electrical discharge can be lowered.

The machining electrode 13 can be fed selectively in two modes, that is, rough feeding and fine feeding. In the rough feeding mode, the body 19 is vertically slid along a post 22a on a base 22 to bring the machining electrode 13 together with the body 19 to a position near a workpiece 24 disposed in a machining bath 23. Thereafter, in the fine feeding mode, a pinion gear 25 is rotated by a motor 26 to rotate a gear 27a integral with a feed screw 27 for thereby vertically moving the feed screw 27, causing a pivot lever 28 to move the machining electrode 13 for a small vertical interval.

A machining circuit is composed of the DC power supply 21, a capacitor 29, and a resistor 30 through which the brush 20 is connected to the DC power supply 21. A machining current flowing through the machining circuit is detected by a current monitor 31 and utilized for enabling a servo control circuit 32 to control the speed and direction of rotation of the motor 26 for controlling the speed and direction of fine feeding movement of the machining electrode 13. When an ordinary electrical discharge is generated between the machining electrode 13 and the workpiece 24, the motor 26 is rotated counterclockwise at a prescribed constant speed to feed the machining electrode 13 at a predetermined speed toward the workpiece 24. When the machining electrode 13 and the workpiece 24 in the machining bath 23 are short-circuited, the current monitor 31 detects a short-circuiting current and causes the servo control circuit 32 to rotate the motor 26 clockwise at a high speed for moving the machining electrode 13 away from the workpiece 24 at a high speed. After the short circuit has been eliminated, the motor 26 is rotated counterclockwise again to feed the machining electrode 13 at the prescribed speed toward the workpiece 24. The workpiece 24 is progressively machined while the above cycle of operation is repeated, thereby forming a minute hole of small out-of-roundness and reduced surface roughness in the workpiece 24. As the wire 1 is consumed by electrical discharge machining, the screw 2 shown in FIG. 2 is loosened and the wire 1 is allowed to fall by gravity or pulled out by forceps, and re-tightened for further machining.

The wire guide 2 may be made of ruby, sintered metal, hard metal, for example, other than ceramics. The pipe 6 may be made of any electrically condictive materials. The guide sleeve 4 may also be made of ruby, sintered metal, ordinary metal, for example, other than ceramics. According to the present embodiment, the clearance between the wire 1 and the wire guide 2 is on the order of 1 micron and hence is negligible.

Figure 1:
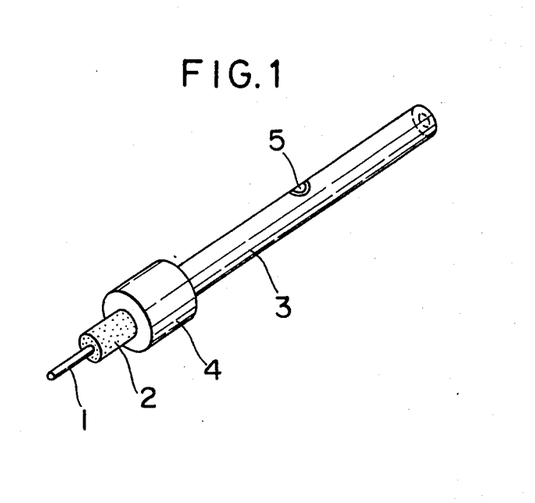
FIG. 1 is a perspective view of a machining electrode according to an embodiment of the present invention.
Figure 8:
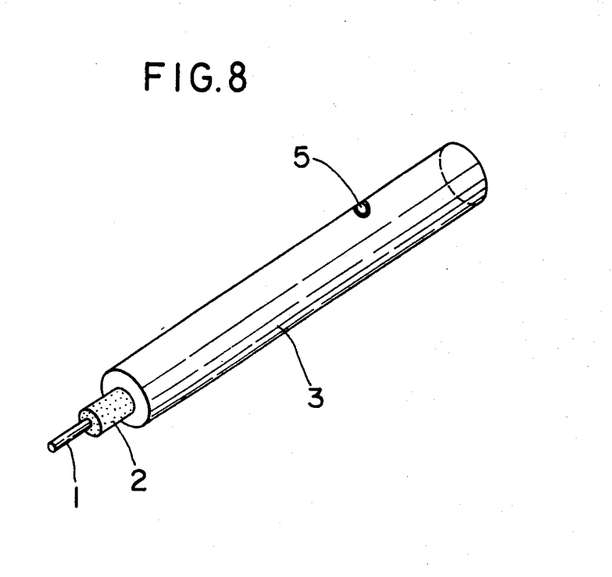
FIG. 8 is a perspective view of a machining electrode according to another embodiment of the present invention.
Figure 9:
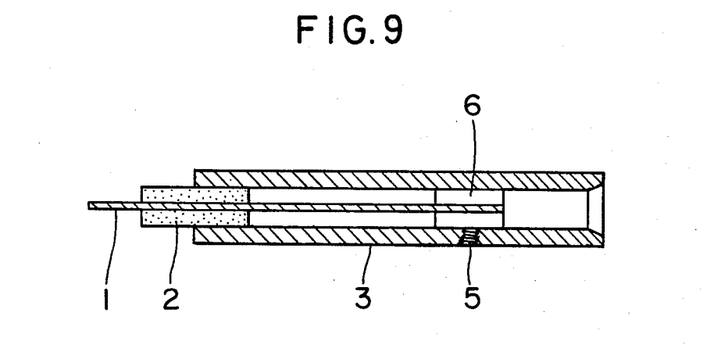
FIG. 9 is a fragmentary longitudinal cross-sectional view of the machining electrode shown in FIG. 8.

FIGS. 8 and 9 are illustrative of a machining electrode according to another embodiment of the present invention. According to this embodiment, the mandrel 3 and the guide sleeve 4 in the embodiment of FIGS. 1 and 2 are integrally formed of the same material.

A thin electrode core wire 1 is guided by a wire guide or support tube 2 of ceramics which is disposed in and attached to a mandrel or rotatable support body 3 made of metal such as quenched steel. The wire guide 2 is fitted in the mandrel 3, as shown in FIG. 9, with a clearance as prescribed by JIS h6 - P6. The wire guide 2 is composed of a cermics pipe for use as an optical fiber connector, with the error of concentricity between the outer peripheral surface and the bore being 1 micrometer or less. The mandrel 3 is machined to render its outer peripheral surface and bore concentric with each other, with a concentricity error being 1 micrometer or smaller. The wire guide 2 is fitted in the mandrel 3 in a manner to reduce any possible displacement of the electrode core wire 51 to a minimum. The distance that the wire guide 2 is inserted longitudinally in the mandrel 3 is sufficiently larger as compared with the diameter of the wire guide 2, so that the wire guide 2 will not be tilted appreciably with respect to the longitudinal axis thereof. As a result, the electrode core wire 1 is subjected to only a greatly reduced displacement.

Where the wire guide 2 has an outside diameter of 2.5 mm or larger, the mandrel 3 may be bored in an ordinary manner, such for example as by being drilled and then finished with a reamer. Since the tool used is of a sufficient rigidity, the bore formed in the mandrel and the outer peripheral surface thereof can be concentric with each other with a concentricity error of a few micrometers.

Figure 10A:
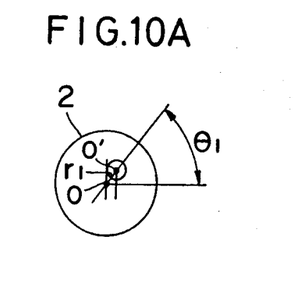
FIGS. 10A, 10B, and 11 are views illustrative of a process of assembling a wire guide and a mandrel of the machining electrodes of the present invention.
Figure 10B:
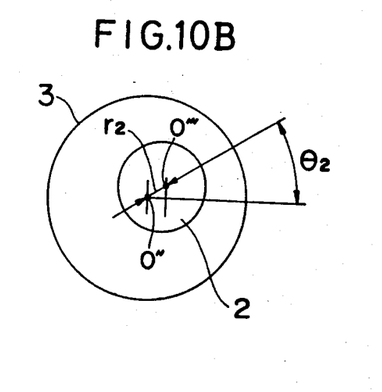
Figure 11:
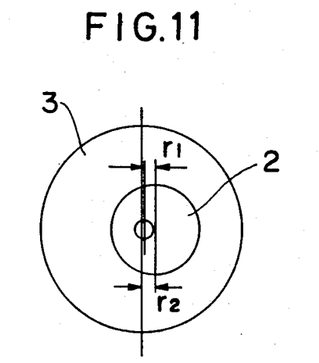

A process of fitting the wire guide 2 in the mandrel 3 in a manner to minimize any possible displacement of the electrode core wire 1 will be described with reference to FIGS. 10A, 10B, and 11. FIG. 10A illustrates the positional relationship between the bore and outer peripheral surface of the wire guide 2, and FIG. 10B shows the positional relationship between the bore and outer peripheral surface of the mandrel 3. As shown in FIG. 10A, the center $0'$ of the bore in the wire guide 2 is radially displaced $r_1$ from the center $0$ of the circular outer peripheral surface of the wire guide 2 at an angular position $\theta_1$. As illustrated in FIG. 10B, the center $0'''$ of the bore in the mandrel 3 is radially displaced $r_2$ from the center $0''$ of the circular outer peripheral surface of the mandrel 3 at an angular position $\theta_2$.

When combining the wire guide 2 and the mandrel 3 together in fitting engagement with each other, the mandrel 3 is angularly moved clockwise about its own axis through an angle of $\theta_2$ in FIG. 10B, and the wire guide 2 is angularly moved counterclockwise about its own axis through an angle of $180_o - \theta_1$. The resulting relative angular positional relationship between the wire guide 2 and the mandrel 3 is illustrated in FIG. 11. More specifically, the error of concentricity R between the bore in the wire guide 2 and the outer peripheral surface of the mandrel 3 can be expressed by the following equation:

$$R = r_2 - r_1$$

As a consequence, the concentricity of the bore in the wire guide 2 fitted in the mandrel 3 with respect to the outer peripheral surface of the mandrel 3 is better than the concentricity of the bore in the wire guide 2 with respect to the outer peripheral surface thereof. The machining electrode with no substantial core wire displacement can therefore be achieved by combining the wire guide 2 and the mandrel 3 which have bore concentricity errors of a few micrometers.

In an actual assembling procedure, a tool microscope having a magnification of 800× is used to determine concentricity errors of the bores in the wire guide 2 and the mandrel 3, and the angular positions $\theta_1$, $\theta_2$ to determine a relative angular position in which to assemble the wire guide 2 and the mandrel 3, followed by forcing the wire guide 2 into the mandrel 3 in the determined relative angular position.

With the above machining electrode construction, the bore in the wire guide 2 and the guide sleeve 4 or the mandrel 3 have a concentricity error of 2 microns or less, which substantially prevents the electrode core wire 1 from being displaced during electrical discharge machining so that a minute hole can be formed which has quite small out-of-roundness and reduced surface roughness.

Figure 12:
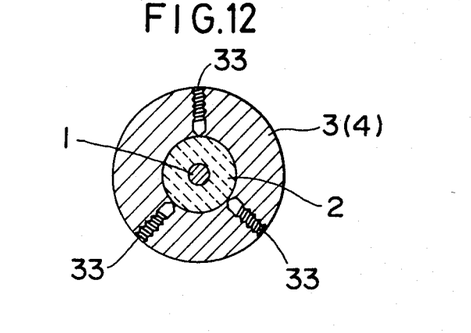
FIG. 12 is a transverse cross-sectional view of a machining electrode according to still another embodiment of the present invention.

When it is necessary to make the concentricity error smaller, the position of the wire guide 2 with respect to the guide sleeve 4 or the mandrel 3 may be adjusted in the radial direction as shown in FIG. 12. More specifically, the guide sleeve 4 or the mandrel 3 surrounding the wire guide 2 has three radial adjustment screws 33 threadedly disposed therein at about 120°-spaced intervals and having tip ends positionable in contact with the outer peripheral surface of the wire guide 2. By adjusting the adjustment screws 33 while observing the position of the wire guide 2 as with a microscope, the wire guide 2 can be positioned into highly concentric relation to the guide sleeve 4 or the mandrel 3.

Figure 13:
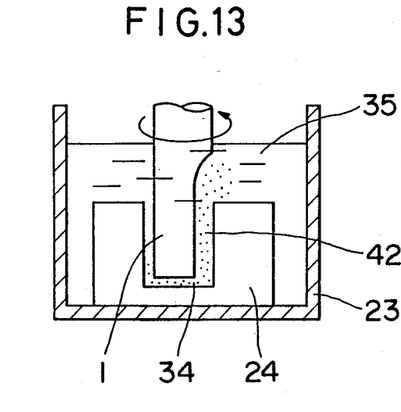
FIGS. 13 and 14 are side-elevational views, partly in cross section, showing the manner in which machining electrode of still further embodiments are used.
Figure 14:
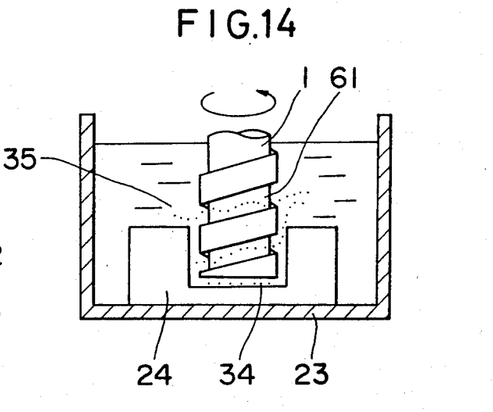

FIGS. 13 and 14 illustrate machining electrodes having chip discharge passages according to further embodiments of the present invention. In FIG. 13, an electrode core wire 1 has a recess 42 extending upwardly from a tip thereof. The workpiece 24 is immersed in an insulative oil 35 such as illuminating kerosene in the machining bath 23. During an initial stage of machining of the workpiece 24 by an electrical discharge between the wire 1 and the workpiece 24, chips 34 produced from the machined workpiece 24 can easily find their way into the oil 35. When the wire 1 is moved downwardly as the machining process proceeds, chips 34 are discharged through the recess 42 serving as a chip discharge passage into the oil 35. As a result, there is no danger of short-circuiting between the wire 1 and the workpiece 24 or of a secondary electrical discharge produced between the wire 1 and the chips 34 or the workpiece 24 and the chips 34, and the speed at which the workpiece 24 is machined can be increased. According to the embodiment of FIG. 14, a machining electrode core wire 1 has a chip discharge passage in the form of a helical groove 61 for allowing chips 34 from the workpiece 24 to be discharged along the helical groove 61 into the oil 35.

With the arrangement of the present invention, when the machining electrode is rotated, the electrode core wire therein is subjected to no appreciable displacement relative to the mandrel or rotatable support body, whereby minute holes of small out-of-roundness, high shape accuracy, and reduced surface roughness can be formed in the workpiece. As the electrode core wire is consumed, it can be fed out from within the rotatable support body. Since a commercially available thin core wire can be used as the electrode core wire, a machining electrode of a long service life can easily be manufactured.

Although certain preferred embodiments of the present invention have been shown and described in detail, it should be understood that various changes and modifications may be made therein without departing from the scope of the appended claims.

What is claimed is:

1. An electrical discharge machining electrode for forming a minute hole in a workpiece, comprising an electrode core wire, a support tube having a bore in which said electrode core wire is slidably supported, said support tube having an outer peripheral surface substantially coaxial with said bore, a hollow guide sleeve into which said support tube is inserted and supported by said guide sleeve, a rotatable support body fitted into and held in said guide sleeve, and means for providing electric conduction between said electrode core wire and said rotatable support body, said hollow guide sleeve providing structural interconnection between said support tube and said rotatable support body.

2. An electrical discharge machining electrode according to claim 1, wherein said means comprises an electrically conductive pipe mounted on an end of said electrode core wire in said rotatable support body and a setscrew by which said electrically conductive pipe is held against and secured to said rotatable support body.

3. An electrical discharge machining electrode according to claim 1, wherein said support tube comprises a ceramic tube.

4. An electrical discharge machining electrode according to claim 1, wherein said support tube is formed from a kneaded mass by vacuum extrusion molding.

5. An electrical discharge machining electrode according to claim 1, wherein said electrode core wire has a passage for discharging chips produced from the workpiece by the electrode core wire.

6. An electrical discharge machining electrode according to claim 1, wherein said support tube has three radial screws at substantially 120°-spaced intervals, said three radial screws having tip ends positionable in contact with the outer peripheral surface of said support tube.

7. An electrical discharge machining electrode for forming a minute hole in a workpiece, comprising an electrode core wire, a support tube having a bore in which said electrode core wire is slidably supported, said bore having a center tending to deviate from a center of an outer peipheral surface of said support tube by a radial distance r, and an angular displacement $\theta$, and a rotatable support body having a bore in whcih said support tube is fitted and supported, said bore of said rotatable body having a center tending to deviate from a center of an outer peripheral surface of said rotatable body by a radial distance $r_2$ and an angular displacement $\theta_2$ said support tube being inserted by force fit into the bore of the rotatable body in a predetermined angular orientation to minimize an error of concentricity R, wherein $R = r_1 - r_2$, between said bore in said support tube and said outer peripheral surface of said rotatable body.

8. An electrical discharge machining electrode according to claim 7, wherein said electrode core wire has a passage for discharging chips produced from the workpiece by the electrode core wire.

9. An electrical discharge machining electrode according to claim 7, wherein said support tube has three radial screws at substantially 120°-spaced intervals, said three radial screws having tip ends positionable in contact with the outer peripheral surface of said support tube.

10. An electrical discharge machining electrode according to claim 7, including means providing electric conduction between said electrode core wire and said rotatable support body.

11. An electrical discharge machining electrode according to claim 10, wherein said means comprises an electrically conductive pipe mounted on an end of said electrode core wire in said rotatable support body and a setscrew by which said electrically conductive pipe is held against and secured to said rotatable support body.

12. An electrical discharge machining apparatus according to claim 7, wherein said support tube comprises a ceramic tube.

13. An electrical discharge machining apparatus according to claim 7, wherein said support tube is formed from a kneaded mass by vacuum extrusion molding.

14. An apparatus for forming a minute hole in a workpiece, comprising a machining electrode composed of an electrode core wire, a support tube having a bore in which said electrode core wire is slidably supported, said support tube having an outer peripheral surface substantially coaxial with said bore, and a rotatable support body connected to said support tube; bearing means having V-shaped grooves for supporting said machining electrode therein, rotating means for rotating said machining electrode about its own axis; and machining electrode moving means comprising a pivot lever for moving the machining electrode, the bearing means and the rotating means in a direction toward and away from the workpiece.

15. An electrical discharge machining apparatus according to claim 14, wherein said bearing means comprises a pair of upper and lower members having said V-shaped grooves, respectively, said machining electrode being supported in said V-shaped grooves against said upper and lower members.

16. An electrical discharge machining apparatus according to claim 14, wherein said machining electrode and said bearing means are electrically insulated from said rotating means and said machining electrode moving means.

17. An electrical discharge machining apparatus according to claim 14, including a hollow guide tube in which said support tube and said rotatable support body are fitted and retained, said electrode core wire and said rotatable support body being electrically conductive with each other.

18. An electrical discharge machining apparatus according to claim 14, wherein said rotatably support body has a bore in which said support tube is supported and an outer peripheral surface, said bore and outer peripheral surface of said rotatable support body being substantially coaxial with each other, said electrode core wire and said rotatable support body being electrically conductive with each other with said support tube inserted in said bore in said rotatable support body.

* * * * *